United States Patent
Yerli

(10) Patent No.: US 8,439,751 B2
(45) Date of Patent: May 14, 2013

(54) MULTI-USER COMPUTER-CONTROLLED INPUT SYSTEM AND A METHOD OF COMPRESSING AND PROCESSING MULTIPLE INPUT DATA

(75) Inventor: Cevat Yerli, Frankfurt am Main (DE)

(73) Assignee: GFACE GmbH, Frankfurt am Main (DE)

( * ) Notice: Subject to any disclaimer, the term of this patent is extended or adjusted under 35 U.S.C. 154(b) by 66 days.

(21) Appl. No.: 13/043,546

(22) Filed: Mar. 9, 2011

(65) Prior Publication Data

US 2011/0223994 A1 Sep. 15, 2011

Related U.S. Application Data

(60) Provisional application No. 61/311,827, filed on Mar. 9, 2010.

(51) Int. Cl.
*G06F 17/00* (2006.01)
(52) U.S. Cl.
USPC .......................................................... 463/31
(58) Field of Classification Search .............. 463/30–33, 463/42; 725/13
See application file for complete search history.

(56) References Cited

U.S. PATENT DOCUMENTS

| | | | |
|---|---|---|---|
| 4,389,048 A | 6/1983 | Burgess | |
| 5,365,266 A | 11/1994 | Carpenter | |
| 6,056,640 A | 5/2000 | Schaaij | |
| 6,227,974 B1 * | 5/2001 | Eilat et al. ........................ | 463/40 |
| 6,257,982 B1 | 7/2001 | Rider et al. | |
| 7,009,561 B2 * | 3/2006 | Menache et al. .............. | 342/463 |
| 7,432,810 B2 * | 10/2008 | Menache et al. ........... | 340/572.1 |
| 7,827,488 B2 * | 11/2010 | Sitrick .......................... | 715/716 |
| 7,961,174 B1 * | 6/2011 | Markovic et al. ............. | 345/158 |
| 2003/0079218 A1 | 4/2003 | Goldberg et al. | |
| 2003/0207704 A1 | 11/2003 | Takahashi et al. | |
| 2004/0210923 A1 | 10/2004 | Hudgeons et al. | |

OTHER PUBLICATIONS

EP11156866; European Search Report dated Jun. 17, 2011.
Christoph Bregler et al.; "Squidball: An Experiment in Large-Scale Motion Capture and Game Design", Jan. 1, 2005, Intelligent Technologies for Interactive Entertainment Lecture Notes in Computer Science; Lecture Notes in Artificial Intelligence; LNCS, Springer, Berlin, DE, pp. 23-33, XP019024828.

* cited by examiner

*Primary Examiner* — Ronald Laneau
(74) *Attorney, Agent, or Firm* — Renner, Otto, Boisselle & Sklar, LLP

(57) ABSTRACT

System and method for running a software application, such as a video game for many users. One embodiment of the invention includes a multi-user computer-controlled video gaming system, comprising: at least one display device for displaying video game motion pictures to an audience of at least two users; a plurality of user input devices, at least one for each user, providing user input data to the computer-controlled video gaming system; a processing unit receiving and processing the user input data from the plurality of input devices to generate control input data for a conjointly control of at least one object being displayed in the video game motion pictures; and at least one computing device executing a game software application controlled by said control input data for providing output to the display device to display the video game motion pictures with said at least one conjointly controlled object.

11 Claims, 2 Drawing Sheets

MULTI-USER COMPUTER-CONTROLLED INPUT SYSTEM AND A METHOD OF COMPRESSING AND PROCESSING MULTIPLE INPUT DATA

FIELD OF THE INVENTION

The present invention relates to a multi-user computer-controlled video gaming system and to a method of preparing input data for running games and similar applications on this system. In particular the present invention relates to a system and a method for preparing input data for providing a multi-user controlled video game to an audience of a plurality of users at a theater, a cinema or at any other location of presentation.

BACKGROUND OF INVENTION

Multi-user computer-controlled video gaming systems are well-known to be provided by Personal Computers or game consoles. These systems mainly include a computing device, i.e. the PC or console, a display device such as a monitor or TV screen, and two or more user input devices such as gamepads, joysticks etc. These systems are limited to a lower number of users and thus cannot be used to provide games and entertainment to a larger group or audience having e.g. 50, 100 or even more users (players).

In order to extend the number of players new systems have been developed for so-called theater gaming which is a modern technology in the field of computer-based games. These systems comprise cinema equipment, a server and gamepads so that a large group of players, i.e. the theater audience, can jointly play computer games. Such a system is disclosed in U.S. Pat. No. 6,257,982 B1 which describes a large screen, interactive, computer-controlled motion picture theater video gaming system. The system comprises display devices (video projector with a large screen), a computing device (computer) for outputting video data to be outputted by the display devices. In order to provide user-control for running the game there are several user input devices (called "user stations"), one for each user and his/her individual input. These input devices have basically the normal design of game controllers, i.e. they have buttons, sticks, sliders and the like which are to be pressed or moved by the respective user. In addition the device can also contain other input methods like audio inputs (e.g. microphones), tactile inputs (e.g. touchpad, touch-sensitive devices), video cameras for recording normal light, infrared or other light sources, also detecting motion by the user to record gestures or other motions or keyboards of any design. This means that each input device generates input data depending on the individual input of the respective user, the input data being sent to the computer for controlling the game, in particular for controlling the behavior of the user's avatar (personal game character) during the running game. Thus each user can participate to the game by interactively controlling his/her avatar or an associated object, like a car, a motorbike etc. However, it would be desirable to have also a conjointly control of the same object by two or more users during a running game.

In other words: In classical interactive game applications the individual players just can control their personal avatars and may then get individual feedback onscreen and/or via sound, gamepad vibration etc. Applications that allow huge groups to interact together need a completely different concept of control and feedback to satisfy users with an enjoyable experience. At present the known video gaming systems do not provide a conjointly control of the same object by two or more users during a running game. In particular there are no systems or method for providing control input data for a conjointly multi-user control of a certain object, such as an avatar or a group of game characters being displayed in video game motion pictures.

SUMMARY

According to a first aspect of the present invention there is provided a multi-user computer-controlled video gaming system, the system comprising:
  at least one display device for displaying video game motion pictures to an audience of at least two users;
  a plurality of user input devices, at least one for each user, providing user input data to the computer-controlled video gaming system;
  a processing unit receiving and processing the user input data from the plurality of input devices to generate control input data for a conjointly control of at least one object being displayed in the video game motion pictures;
  at least one computing device executing a game software application controlled by said control input data for providing output to the display device to display the video game motion pictures with said at least one conjointly controlled object.

Further to this and in correspondence with said system a method of preparing input data for running a game on a multi-user computer-controlled video gaming system is provided, the method comprising the steps of:
  providing user input data which are generated by the plurality of user input devices;
  receiving and processing the user input data by the processing unit to generate control input data for a conjointly control of at least one object to be displayed in video game motion pictures.

Thus a video game (or any other software application) can be conjointly controlled by said control input data.

In particular the present invention proposes a solution for conjointly control of one or more objects in a video game by processing the individual users input data coming from a plurality of input devices, such as gamepads, to generate control input data which represent data for a conjointly control of said object(s) to be displayed in video game motion pictures.

The present invention is also applicable to any user-controllable software application providing outputs to users such as video and/or audio outputs or even electro-mechanical outputs such as vibration of user devices etc. In particular the present invention allows to run software applications in the field of group gaming taking into account even hundreds of users' inputs. Since the many individual inputs are compressed to a few (one or some) control input data which can be processed by the application, the invention can preferably applied to conjointly control one or more certain objects/element of a video game. An example of interactive application is the conjointly control of a single avatar or a certain group of avatars in a game by many players simultaneously.

According to another aspect of the present invention the at least one computing device executes the game software application according to said control input data being provided by the processing unit. Preferably the user input devices comprise input sensor means, in particular for detecting tactile, video and/or audio inputs like buttons, sticks and sliders, microphones, touchpads, gestures and the like, to generate the user input data for each user as raw data representing his or her individual input. The processing unit may then process these user input data to generate the control input data by at least one of the following operations:

filtering and/or compressing the user input data, in particular by matching the user input data against at least one pattern;

weighting the user input data, in particular by applying a weighting function to at least one of the user input data;

adding meta data to the control input data, in particular adding data about the number of registered and/or active user input devices;

processing the user input data according to pre-defined rules and/or rules being modified by said at least one computing device executing the game software application.

It is to be understood that the invention is not restricted to video games, but can be applied to any computer-based application for providing entertainment or information to a plurality of users. Based on the needs of the application the incoming user input data is sorted, filtered and compressed to transfer a processed control input data to the actual application.

Further to this the system can comprise at least one data link for sending feedback data from the at least one computing device to the processing unit. Preferably the at least one computing device provides such feedback data that contain information and/or commands for instructing the processing unit to execute said at least one operation, in particular provides feedback data containing information about said pre-defined rules and/or about modification of said rules. As the application is interactive a constant stream of user input is entering the system. By providing feedback to the processing unit the application can dynamically update and/or modify the way of how the raw input data are processed.

In preferred embodiments of the invention the at least one computing device is realized by a workstation or a game server the processing unit is realized as an external or internal part of said workstation or server.

BRIEF DESCRIPTION OF THE DRAWINGS

Further features and advantages of the present invention, as well as the structure and operation of various illustrative embodiments of the present invention, are described in more detail below with reference to the accompanying schematic drawings, wherein.

DETAILED DESCRIPTION OF PREFERRED EMBODIMENTS

The present invention relates to a multi-user computer-controlled video gaming system and allows a software entertainment application to give two or more users, even hundreds of users, the conjointly control over one or more objects, such as avatars or game characters. The way the input data is processed, i.e. filtered and/or compressed, is depending on the actual application.

Figure 1:
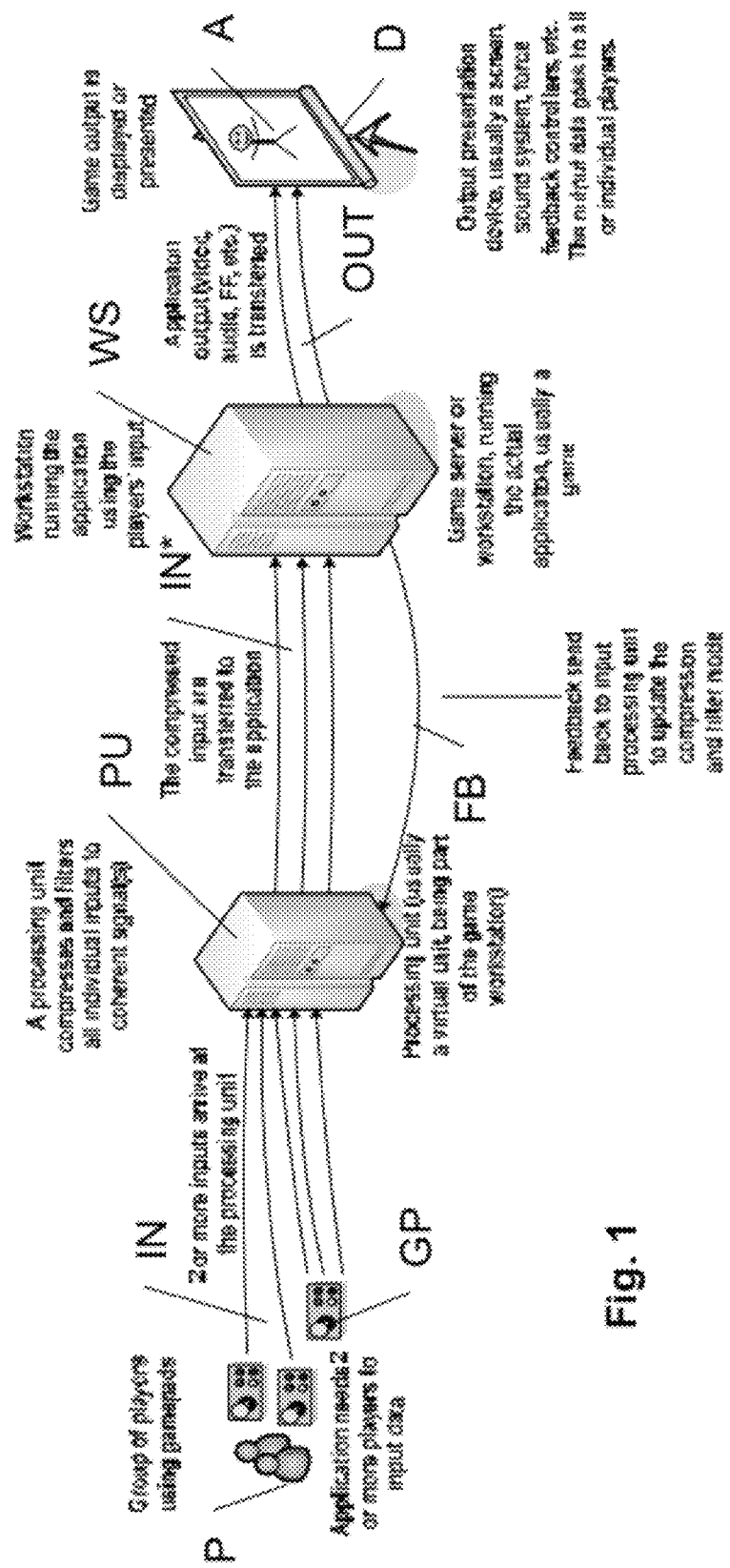
FIG. 1 shows the architecture of a multi-user computer-controlled video gaming system of the present invention.

In FIG. 1 there is shown a multi-user computer-controlled video gaming system which can be installed in a theater. The system comprises at least one display device being represented by a large screen D on which video game motion pictures are projected and to be shown to an audience of two or more users. The system further comprises at least one computing device which is represented here by a workstation WS executing a game software application and providing output OUT (video/audio signal) to the display device D. Accordingly video game motion pictures with at least one conjointly controlled object such an avatar A is displayed. The behavior of said avatar A is conjointly controlled by control input data IN* which are derived from evaluating the individual user input data IN coming from a plurality of user input devices GP which are located at the user seats of the theater.

In order to gain said control input data IN* and thus to allow a conjointly control of a certain object, such as the avatar A on screen D, the system comprises a processing unit PU to which the gamepad controllers GP are connected. The processing unit PU can be an integral part of the workstation, but in the embodiment shown in FIG. 1 the processing unit PU is realized by a separate unit being installed apart from but being connected with said workstation WS, e.g. by a local area network.

The processing unit PU receives the individual user input data IN which are just raw data and continuously processes these data to generate control data IN* for a conjointly control of said avatar A. Apparently the application, i.e. the game software running on workstation WS, needs readable control data (instructions or commands) like "avatar moves forward", but the raw data IN coming from the users do not provide such discreet commands and are very voluminous. To overcome this problem, the invention generates discreet control input data IN* by processing the incoming user input data IN in such a way that the application can easily handle these data IN* and interpret/understand the commands thereof. This counts for all input methods mentioned. Since the control data IN* are derived from many individual user input data, these data IN* reflect the shared and joint will of the users being involved. (The method of preparing the input data will be described below in more detail and by reference to FIG. 2.)

As shown in FIG. 1 the system further comprises a feedback data link between the workstation WS and the processing unit PU. This link is used to modify and/or adapt the processing of the input data IN to the current needs of the running application. This preparation and processing of the user input data IN can be flexible and may react on the actual needs of the system. (This will also be described in more detail further below.)

What can also be seen from the FIG. 1 is that the system can easily handle user input data from one or more groups of users separately. Thus a first group of users can collectively control their avatar, i.e. the avatar of the first group, whereas a second group can collectively control a different avatar being the avatar of this second group. The groups can also use different input methods which are processed independently from each other if necessary. This solution is very attractive for running game competitions between two or more groups. Many other scenarios can be realized by the present invention. This will become also apparent from the following description of a method of preparing input data in the multi-user controlled gaming system of FIG. 1.

Figure 2:
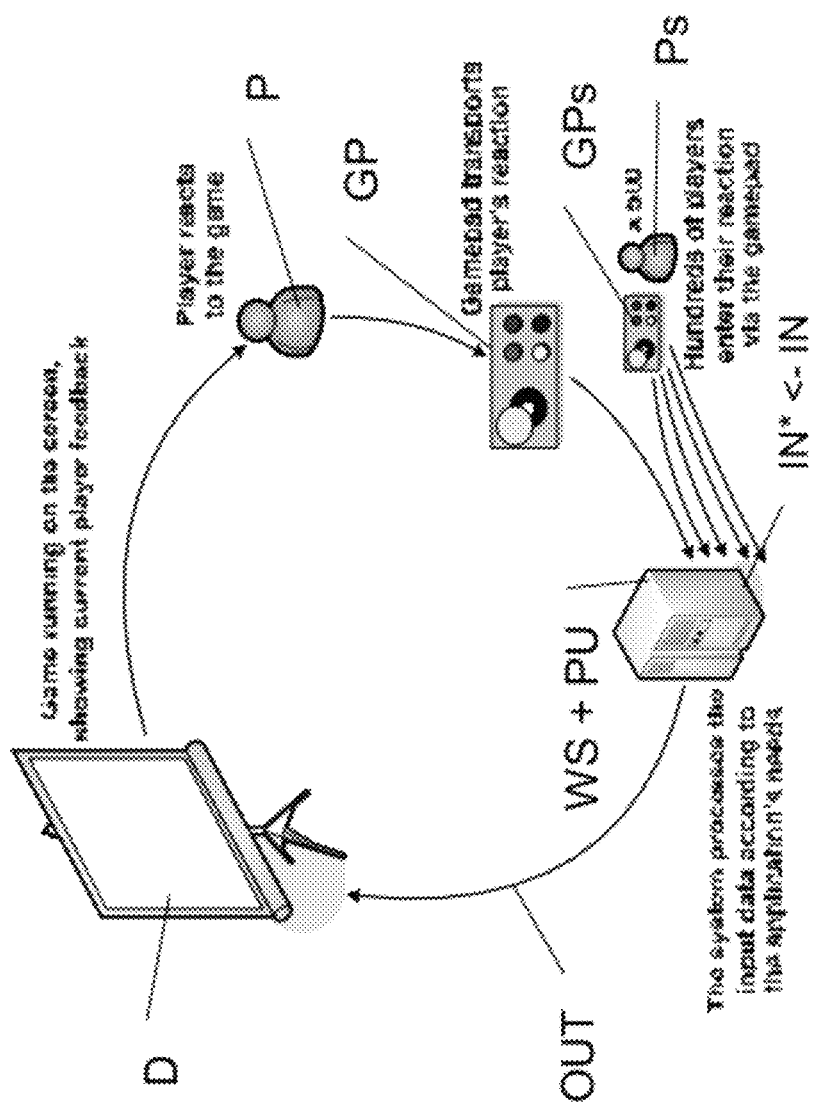
FIG. 2 schematically illustrates the steps of a method for preparing input data for running a game on the multi-user computer-controlled video gaming system of FIG. 1.

The FIG. 2 schematically illustrates the steps of said method which provides a dynamic feedback loop for jointly controlling at one certain object, such as an avatar, within a running video game:

The software application which runs on the workstation WS (also see FIG. 1) may send a request to the system on what data is valid at any current time. The system, in particular the processing unit PU (also see FIG. 1), then processes the input data IN, by e.g. filtering valid input data from invalid and by compressing the valid information from the users to a discreet command represented by control data IN*. These data IN* can further contain additional metadata like (e.g. how many users were involved in valid/invalid data, which input device was used etc.). These data IN* are then transferred to the actual application.

A key issue is to provide satisfaction to the users to make them feel of "having the control" of the application. As no single user is actually controlling the avatar (or other application objects/elements) alone the impression always arises that he/she has no real impact on the application. This problem can be solved by several processing methods described below.

Description of Processing Methods:

In basic terms a user P uses his/her input device GP to react on any presentation of video data on the screen. Consequently individual input data IN of every single user are sent to the processing unit PU. Any different input methods can be processed in a specific processing method simultaneously. This unit can be any software and/or hardware that can process the user input data of many users (e.g. a software function in the application or a stand alone server). The processed data will be sent as control data IN* to the application.

The processing unit PU is based on different components. These components describe which input is processed how and when. The incoming input data IN will be processed in several steps (see list of possible patterns below) such as different patterns are applied onto the data IN according to the components and underlying logic. The order of the process steps is not necessary the order of the listed components. The final processed data is the data that was computed through all applicable patterns.

I) Pattern Matching:

All incoming data IN is matched against a pattern. A pattern can by anything that the user can do with an input device GP. A pattern may cover very simple states like pressing a button/key but can also cover extremely complex action (e.g. move stick up, press a key, move stick down, press a button and move up again—or much more complex input combinations). Some patterns need to be matched within a specific timeframe whereas other patterns may have no time limit.

a) Match one pattern:
All incoming input data IN from every user P is compared to one single pattern. The result can be a "done" or "not done" or a value that indicates how good the pattern was matched.

b) Match multiple patterns:
The incoming data is compared to several patterns. The result can be a chart that indicates that each pattern was matched and/or how good it was matched.

c) No given pattern:
In that case the incoming data is used "as is" and will not be processed, e.g. the input data IN are transferred as raw data to the application.

II) Weighting of Input:

For some reason it might be desirable to adjust how much influence a given user input has. For this a function takes the input data and transfers the weighted data to the application. This function can be any software and/or hardware that changes the intensity of influence of single user inputs or of any group size of users. Basically the function scales up and down the values of a user input. The kind of weighting is based upon the pattern the application requests.

a) Weight complete inputs:
All user inputs IN are changed by the weighting function. The processed data is the result of the function.

b) Partially weight inputs:
Only some of the users' inputs (part of IN) are changed by the weighting function while the rest is not affected. The users can be separated into any number of groups or subgroups with a different weighting each.

c) Not weighting:
In that case the input data IN are not changed at all in terms of its weighting.

III) Sending Processed Data:

Finally the processed data, i.e. the control data IN*, are sent to the application. The exact time when data will be sent can depend on how the application manages the incoming control data IN*.

a) In fixed time steps:
The processed data is sent to the application isochronously.

b) At any time:
Always when an input IN is coming from a user P it is processed and will be sent instantly to the application.

c) Upon request:
The processing unit calculates all incoming data continuously. It changes internally the data with the last updated input to keep the processed data at the latest state. At any time the application can send a request to the processing unit. Then the processing unit sends the requested data back.

d) Upon change:
Processed data will only be sent if a change of data occurred. The application than assumes that the processed data is the same every time until a new data input IN* is coming in.

IV) Sending Metadata (First Embodiment):

The processing unit PU can also provide the application with more data than only the pure control data. Further data which not necessarily needed to calculate the correct behavior of the application, in particular the avatar, is referred as metadata. The metadata can comprise for instance the number of registered input devices, what input devices are used, the number of active users and further more. For example, since the unprocessed data IN of every single device is not needed for the application in many cases (the application uses the data IN* for all internal computations), this is referred as metadata, as it is complementary information.

a) Send always:
The metadata is sent every time along with the processed data (control data IN*).

b) Send on request:
The metadata only is send if the application is requesting it.

c) Timebased:
The metadata is sent every x seconds to the application.

V) Sending Metadata (Second Embodiment):

Sending metadata can be done in several selective ways to save bandwidth and computation power. All metadata sent will be compressed independent of its processed status.

a) Send all:
All metadata is sent along with the processed data.

b) Send partially:
The application decides which metadata needs to be sent. (see VI) below for more details). For example a template defines the amount of sent data.

c) Send nothing:
   No metadata are sent; only the processed data are transferred.

VI) Defining Processing Rules:
To further enhance the compressing and filtering the processing unit PU may decide on given rules how the input data needs to be processed and which metadata needs to be sent. There are several possibilities to define these rules.
   a) Definition by default:
      The rules are defined in a list that is known by both the processing unit and the application. Whenever there are no special rules defined the default rules will be used.
   b) Definition by template:
      Several lists that contain the rules are predefined as so-called templates. The application or the processing unit PU may choose from one template and indicate the other unit/application which list is chosen. According to this the data will be processed and the application knows which data is currently sent.
   c) Definition on the fly:
      A current list of rules can be adjusted while running the application by informing the processing unit (or vise versa) that an existing rule shall be deleted/adjusted or by creating a new rule.

The above mentioned elements are options/components which are independent from each other and their properties can be combined arbitrary. For illustration purpose the following examples are given:

Timed processed input:
   To specify the system such that the users must input a specific command within a timeframe the components from options Ia), IIc), IIIa), IVa), Va) and VIa) can be choosen.

Timesliced processed input:
   If the game application shall have the current processed user data at a specific time the components from options Ic), IIc), IIIc), IVb), Va) and VIa) can be choosen.

Weighted processed input:
   If different experienced or skilled users/players are involved during the running application the components from options Ic), IIa), IIIa), IVa), Va) and VIa) could be used. With the appropriate weighting function the more experienced users can get more influence on decisions.

Vote based input:
   If the system shall also have the function of an electronic voting machine the components from options Ib), IIc), IIIa), IVa), Va) and VIa) can be choosen.

In the following reference is made again to FIG. 1 for further describing the compression and filtering of multiple user inputs:

i) First the users or players P use the input devices to produce individual control inputs. These input data IN are then transferred as raw data to the data processing unit PU.

ii) The processing unit PU then processes and transforms the raw data into compressed data (control input data IN*) according to current rules which are defined by the game application. The processing unit can be a separate device (e.g. a PC), but can also be a specific application running on the workstation WS or just a part of the actual application running as a subroutine.

iii) The workstation WS running the actual application gets the processed input data IN*. The application changes its current state based on the input data. Any change in the requirements for future input data is transferred back to the processing unit PU by sending corresponding feedback data FB.

iv) The workstation WS then sends according to the new application state the output OUT to the display devices, like video screens and/or audio equipment, and optionally to other output devices such as electro-mechanical devices to produce gamepad vibrations the like. Hence the users see, hear and optionally feel the output as a result of the conjointly controlled action and can react on it again. In addition to the output that is shared by all users (for example the big video screen) some output can be personalized (for example the vibrations feedback).

With respect to FIG. 2 the shown Dynamic Feedback Loop will now be described in further details:

A preferred use but not the only use of the present system can enhance theater or cinema gaming. In particular the feedback of the users playing a game shall be evaluated for constantly changing the progress of the game, wherein the changes shall, inter alia, be based on pre-defined game rules and on the processed user's inputs to get a conjointly control of the game. The high interactivity can mainly be based on the three following elements:

I.) The game's logic defines the gameplay and adjusts the quantity and/or quality of the inputs the users provide.

II.) The combined effort of all users defines how well the group of users is performing.

III.) The overall performance of the users as a group is defined by each individual player. Each user is also able to influence the other users directly by communicating to them and indirectly by creating his input data.

Since at least the third element is special for interactive applications like video games that are played by a huge group (or at least two users), there are special methods needed to provide users with those experiences that they will expect from a normal video game (or interactive application).

In particular each user expects a feeling of "having the control" of the running game (or application). For providing this feeling a dynamic feedback loop function may display to all users the current choices (or votes) of all users. Thus every user can instantly see if his/her individual input is in line with the most of the other inputs or not, taking into account all input methods used (be it via tactile, acoustic, visual or other methods). Before the application will let avatar actually react each user can see onscreen what most of the users have chosen for the next action. In view of this "open voting" each user can reflect about his/her individual input and may overrule it. Thus the users' reactions are based on the application (displaying the current video scene) and on the choice of the other users (open voting). The amount of votes can change constantly (depending on the user's reaction). Thus the decision making is a highly dynamic process influenced by everyone. The application can decide by situation or time when the avatar actually shall react. The present system allows hundreds of users to feel that they are part of the action and have real influence on the application's progress.

In addition to the onscreen feedback the users are encouraged to communicate directly to each others, too. This increases the group feeling with the help of the onscreen feedback. The users not only interact with the application, but also with the whole group of users.

The described invention is not restricted to video gaming, but can be applied to any software application which is running on multi-user computer-controlled system which comprises:

at least one output device for providing output, in particular video and/or audio output, to an audience of at least two users;
a plurality of user input devices, at least one for each user, providing user input data to the computer-controlled system;
a processing unit receiving and processing the user input data from the plurality of input devices (GP) to generate control input data for a conjointly control of at least one object or element being part of the output of the running software application;
at least one computing device executing the software application controlled by said control input data for providing said output containing said at least one conjointly controlled object.

What is claimed is:

1. A multi-user computer-controlled video gaming system, the system comprising:
    at least one display device (D) for displaying video game motion pictures to an audience of at least two users (P);
    a plurality of user input devices (GP), at least one for each user (P), providing user input data (IN) to the computer-controlled video gaming system;
    a processing unit (PU) receiving and processing the user input data (IN) from the plurality of input devices (GP) to generate control input data (IN*) for a conjointly control of at least one object (A) being displayed in the video game motion pictures;
    at least one computing device (WS) executing a game software application controlled by said control input data (IN*) for providing output (OUT) to the display device (D) to display the video game motion pictures with said at least one conjointly controlled object (A); and
    at least one data link for sending feedback data (FB) from the at least one computing device (WS) to the processing unit (PU) to adapt the processing of the user input data (IN).

2. The multi-user computer-controlled video gaming system of claim 1, wherein the user input devices (GP) comprise input sensor means, in particular sensor means like microphones for detecting audio input and/or sensor means like buttons, sliders or keyboards for detecting tactile input, and/or sensor means like recorded camera data to generate the user input data (IN) for each user (P) as raw data representing his or her individual input.

3. The multi-user computer-controlled video gaming system of claim 1, wherein the at least one conjointly controlled object is a single game character, in particular an avatar (A), or a group of game characters and wherein the at least one computing device (WS) executes the game software application under control of said control input data (IN*) being provided by the processing unit (PU).

4. The multi-user computer-controlled video gaming system of claim 3, wherein the user input devices (GP) comprise input sensor means, in particular sensor means like microphones for detecting audio input and/or sensor means like buttons, sliders or keyboards for detecting tactile input, and/or sensor means like recorded camera data to generate the user input data (IN) for each user (P) as raw data representing his or her individual input.

5. The multi-user computer-controlled video gaming system of claim 1, wherein the processing unit (PU) processes the user input data (IN) received from the plurality of user input devices (GP) to generate the control input data (IN*) by at least one of the following operations:
    filtering and/or compressing the user input data (IN), in particular by matching the user input data (IN) against at least one pattern;
    weighting the user input data (IN), in particular by applying a weighting function to at least one of the user input data (IN);
    adding meta data to the control input data (IN*), in particular meta data comprising information about the number of registered and/or active user input devices (GP);
    processing the user input data (IN) according to pre-defined rules and/or rules being modified by said at least one computing device (WS) executing the game software application.

6. The multi-user computer-controlled video gaming system of claim 5, wherein the at least one computing device (WS) provides said feedback data (FB) which contain information and/or commands for instructing the processing unit (PU) to execute said at least one operation, in particular provides feedback data (FB) containing information about said pre-defined rules and/or about modifications of said rules.

7. The multi-user computer-controlled video gaming system of claim 1, wherein the at least one computing device (WS) provides feedback data (FB) which contain information and/or commands for instructing the processing unit (PU) to execute at least one operation for processing of the user input data (IN), in particular provides feedback data (FB) containing information about said pre-defined rules and/or about modifications of said rules.

8. The multi-user computer-controlled video gaming system of claim 1, wherein the at least one computing device (WS) is realized by a workstation or game server and wherein the processing unit (PU) is realized as an external or internal part of said workstation.

9. A multi-user computer-controlled system for running a software application, in particular a video game, the system comprising:
    at least one output device for providing output, in particular video and/or audio output, to an audience of at least two users;
    a plurality of user input devices, at least one for each user, providing user input data to the computer-controlled system;
    a processing unit receiving and processing the user input data from the plurality of input devices (GP) to generate control input data for a conjointly control of at least one object or element being part of the output of the running software application;
    at least one computing device executing the software application controlled by said control input data for providing said output containing said at least one conjointly controlled object; and
    at least one data link for sending feedback data from the at least one computing device to the processing unit to adapt the processing of the user input data.

10. A method of preparing input data for running a game in a multi-user computer-controlled video gaming system, the system comprising at least one display device (D), a plurality of user input devices (GP), a processing unit (PU) and at least one computing device (WS) executing a game software application, the method comprising the steps of:
    receiving user input data (IN) which are generated by the plurality of user input devices (GP);
    processing the user input data (IN) by the processing unit (PU) to generate control input data (IN*) for a conjointly control of at least one object (A) to be displayed in video game motion pictures; and receiving feedback data (FB) from the at least one computing device (WS) to adapt said processing of the user input data (IN).

11. A method of controlling a video game running on a multi-user computer-controlled video gaming system, the system comprising at least one display device (D), a plurality of user input devices (GP), a processing unit (PU) and at least one computing device (WS) executing a game software application, the method comprising the steps of:

receiving user input data (IN) which are generated by the plurality of user input devices (GP);

processing the user input data (IN) by the processing unit (PU) to generate control input data (IN*) for a conjointly control of at least one object (A) to be displayed in video game motion pictures;

conjointly controlling by said control input data (IN*) the at least one computing device (WS) for executing the game software application and for providing output (OUT) to the display device (D) to display the video game motion pictures with said at least one conjointly controlled object (A); and receiving feedback data (FB) from the at least one computing device (WS) to adapt said processing of the user input data (IN).

* * * * *